(12) United States Patent
Kelly et al.

(10) Patent No.: US 9,865,050 B2
(45) Date of Patent: *Jan. 9, 2018

(54) MEASURING INTRAMUSCULAR FAT

(71) Applicant: Hologic, Inc., Marlborough, MA (US)

(72) Inventors: Thomas L. Kelly, Groveland, MA (US); Kevin E. Wilson, Acton, MA (US)

(73) Assignee: HOLOGIC, INC., Marlborough, MA (US)

( * ) Notice: Subject to any disclaimer, the term of this patent is extended or adjusted under 35 U.S.C. 154(b) by 694 days.

This patent is subject to a terminal disclaimer.

(21) Appl. No.: 14/444,547

(22) Filed: Jul. 28, 2014

(65) Prior Publication Data

US 2015/0036910 A1 Feb. 5, 2015

Related U.S. Application Data

(63) Continuation of application No. 13/217,688, filed on Aug. 25, 2011, now Pat. No. 8,792,689, which is a (Continued)

(51) Int. Cl.
*G06K 9/00* (2006.01)
*G06T 7/00* (2017.01)
*G06T 11/00* (2006.01)

(52) U.S. Cl.
CPC .......... *G06T 7/0012* (2013.01); *G06T 11/008* (2013.01); *G06K 9/00* (2013.01);
(Continued)

(58) Field of Classification Search
CPC ....... A61B 6/482; A61B 6/4241; A61B 6/505; A61B 5/4872; A61B 6/4233; A61B 6/508;
(Continued)

(56) References Cited

U.S. PATENT DOCUMENTS 6,198,797 B1 3/2001 Majima et al.
6,215,846 B1 * 4/2001 Mazess ................ A61B 6/4225
348/E3.045

(Continued)

OTHER PUBLICATIONS

Hill et al., "Estimating Abdominal Adipose Tissue With DXA and Anthropometry," Obesity, 15(2):504-510 (Feb. 2007).

(Continued)

*Primary Examiner* — Aklilu Woldemariam
(74) *Attorney, Agent, or Firm* — Kriegsman & Kriegsman

(57) ABSTRACT

Dual-energy absorptiometry is used to estimate intramuscular adipose tissue metrics and display results, preferably as related to normative data. The process involves deriving x-ray measurements for respective pixel positions related to a two-dimensional projection image of a body slice containing intramuscular adipose tissue as well as subcutaneous adipose tissue, at least some of the measurements being dual-energy x-ray measurements, processing the measurements to derive estimates of metrics related to the intramuscular adipose tissue in the slice, and using the resulting estimates. Processing the measurements includes an algorithm which places boundaries of regions, e.g., a large region and a smaller region. The regions are combined in an equation that is highly correlated with intramuscular adipose tissue measured by quantitative computed tomography in order to estimate intramuscular adipose tissue.

19 Claims, 7 Drawing Sheets

Related U.S. Application Data continuation-in-part of application No. 13/045,966, filed on Mar. 11, 2011, now Pat. No. 9,086,356, which is a continuation-in-part of application No. 12/730,051, filed on Mar. 23, 2010, now Pat. No. 9,179,873.

(52) U.S. Cl.
CPC ............ G06T 2207/10081 (2013.01); G06T 2207/10116 (2013.01); G06T 2207/20021 (2013.01); G06T 2207/30004 (2013.01); G06T 2211/408 (2013.01)

(58) Field of Classification Search
CPC ....... A61B 6/542; A61B 6/563; A61B 6/4035; A61B 6/50; A61B 6/583; A61B 6/461; A61B 5/107; A61B 5/0022; A61B 5/0537; A61B 5/742; A61B 6/0421; A61B 6/4225; A61B 6/4441; G01N 2223/1003; G01N 23/06; G01N 2223/612; G01N 23/046; G01N 2223/419; G01N 2223/06; Y10S 378/901; G06T 11/008; G06T 2207/10081; G06T 2207/10116; G06T 2207/20021; G06T 2207/30004; G06T 2211/408; G06T 7/0012; G06T 7/11; G06T 2207/10072; G06T 2207/10132; A61K 38/00; G06K 2009/4666; G06K 9/46; H04N 3/2335; H04N 5/217; H05G 1/60
USPC ...... 382/129, 130, 131, 132; 378/4, 5, 9, 18, 378/19, 901
See application file for complete search history.

(56) References Cited

U.S. PATENT DOCUMENTS

| | | | | |
|---|---|---|---|---|
| 6,233,473 | B1 * | 5/2001 | Shepherd | A61B 6/032 378/54 |
| 6,315,447 | B1 * | 11/2001 | Nord | A61B 6/482 378/18 |
| 6,468,209 | B1 * | 10/2002 | Heymsfield | A61B 5/0537 128/897 |
| 6,816,564 | B2 * | 11/2004 | Charles, Jr. | A61B 6/032 378/18 |
| 6,969,350 | B1 * | 11/2005 | Hawthorne | A61B 5/107 128/898 |
| 6,999,549 | B2 | 2/2006 | Sabol et al. | |
| 7,444,961 | B1 | 11/2008 | Ellis | |
| 7,725,153 | B2 | 5/2010 | Kelly et al. | |
| 8,300,911 | B1 | 10/2012 | Payne et al. | |
| 8,483,458 | B2 | 7/2013 | Payne et al. | |
| 8,792,689 | B2 | 7/2014 | Kelly et al. | |
| 9,086,356 | B2 | 7/2015 | Kelly et al. | |
| 9,179,873 | B2 | 11/2015 | Kelly et al. | |
| 2001/0053202 | A1 * | 12/2001 | Mazess | A61B 6/4225 378/196 |
| 2006/0074288 | A1 * | 4/2006 | Kelly | A61B 5/4872 600/407 |
| 2010/0086185 | A1 | 4/2010 | Weiss | |
| 2010/0234719 | A1 | 9/2010 | Kelly et al. | |
| 2011/0002522 | A1 | 1/2011 | Goto et al. | |
| 2011/0158386 | A1 | 6/2011 | Payne et al. | |
| 2011/0164798 | A1 | 7/2011 | Masumoto | |
| 2011/0311122 | A1 * | 12/2011 | Kelly | G06T 7/0012 382/132 |
| 2015/0374291 | A1 | 12/2015 | Kelly et al. | |
| 2016/0228057 | A1 | 8/2016 | Kelly et al. | |

OTHER PUBLICATIONS

Jensen et al., "Measurement of abdominal and visceral fat with computed tomography and dual-energy x-ray absorptiometry," Am J Clin Nutr., 61(2):274-278 (Feb. 1995).

Bertin et al., "Measurement of visceral adipose tissue by DXA combined with anthropometry in obese humans," Int J Obes Relat Metab Disord., 24(3):263-270 (Mar. 2000).

Gronenmeyer et al., "Fast Adipose Tissue (FAT) Assessment by MRI," Magnetic Resonance Imaging, 18:815-818 (2000).

Hayashi et al., "Visceral Adiposity and the Prevalence of Hypertension in Japanese Americans," Circulation, 108:1718-1723 (2003).

Hologic Clarity of Vision, Discovery QDR Series Advanced Point-of-Care Bone Health Assessment, Hologic Osteoporosis Assessment (May 2004).

Hologic Clarity of Vision, Explorer Fan-Beam DXA for the Cost-Conscious Practice, Hologic Osteoporosis Assessment (Jan. 2004).

Kelly et al., "DXA Body Composition: Theory and Practice," Appl Radia., 49(5:6):511-513 (1988).

Kobayashi et al., "A Novel Method of Measuring Intra-Abdominal Fat Volume Using Helical Computed Tomography," International Journal of Obesity, 26:298-402 (2002).

Krotkiewski et al., "Impact of Obesity on Metabolism in Men and Women. Importance of Regional Adipose Tissue Distribution," J Clin Invest., The American Society for Clinical Investigation, Inc., 72:1150-1162 (1983).

Kvist et al., "Total and visceral adipose-tissue volumes derived from measurements with computed tomography in adult men and women: predictive equations 1-3," Am J Clin Nutr, 48:1351-1361 (1988).

Ley, "Sex- and menopause-associated changes in body-fat distribution," Am J Clin Nut, 55:950-954 (1993).

Montague et al., "Perspectives in Diabetes the Perils of Portliness Causes and Consequences of Visceral Adiposity," Diabetes, 49:883-888 (2000).

Morricone et al., "Relationship of Visceral Fat Distribution to Angiographically Assessed Coronary Artery Disease: Results in Subjects With or Without Diabetes or Impaired Glucose Tolerance," PMID: 12616807 [PubMed—indexed for Medline], Nutr Metab Cardiovasc Dis., 12(5):275-283 (2002).

Nicklas et al., "Visceral Adipose Tissue Cutoffs Associated With Metabolic Risk Factors for Coronary Heart Disease in Women," Epidemiology/Health Services/Psychosocial Research, Diabetes Care, 26:1413-1420 (May 2003).

Pritchard et al., "Evaluation of Dual Energy X-Ray Absorptiometry as a Method of Measurement of Body Fat," European Journal of Clinical Nutrition, 47:216-228 (1993).

Slosman et al., "Assessment of Whole-Body Composition With Dual-Energy X-Ray Absorptiometry," Radiology, 185:593-598 (1992).

Trueth et al., "Estimating Intraabdominal Adipose Tissue in Women by Dual-Energy X-Ray Absorptiometry," Am J Clin Nutr, 62:427-432 (1995).

Hill et al., "Estimating Abdominal Adipose Tissue With DXA and Anthropometry,"Obesity, 15(2):504-510 (Feb. 2007).

Hologic Clarity of Vision, Explorer Fan-Beam DXA for the Cost-Conscious Practice Hologic Osteoporosis Assessment (Jan. 2004).

Kvist et al., Total and visceral adipose-tissue volumes derived from measurements with computed tomography in adult men and women: predictive equations 1-3 Am J Clin Nutr, 48:1351-1361 (1988).

Morricone et al., "Relationship of Visceral Fat Distribution to Angiographically Assessed Coronary Artery Disease: Results in Subjects With or Without Diabetes or Impaired Glucose Tolerance," PMID: 12616807 [PubMed-indexed for MEDLINE], Nutr Metab Cardiovasc Dis., 12(5): 275-283 (2002).

Trueth et al., "Estimating Intraabdominal Adipose Tissue in Women by Dual-Energy X-Ray Absorptiometry," Am J Clin Nutr, 62: 427-432 (1995).

* cited by examiner

MEASURING INTRAMUSCULAR FAT

CROSS-REFERENCE TO RELATED APPLICATIONS

This application is a continuation of U.S. patent application Ser. No. 13/217,688, titled MEASURING INTRAMUSCULAR FAT, filed Aug. 25, 2011, which is a continuation-in-part of U.S. patent application Ser. No. 13/045,966, titled VISCERAL FAT MEASUREMENT, filed Mar. 11, 2011, which is a continuation-in-part of U.S. patent application Ser. No. 12/730,051, titled ESTIMATING VISCERAL FAT BY DUAL-ENERGY X-RAY ABSORPTIOMETRY, filed Mar. 23, 2010, all of which are incorporated by reference.

BACKGROUND OF THE INVENTION

The condition associated with loss of skeletal muscle mass and strength that occurs with advancing age is known as Sarcopenia. Studies have shown that an increase of intramuscular adipose tissue occurs in people who suffer from the Sarcopenic condition. Consequently, measurement of intramuscular adipose tissue may be useful for diagnostic purposes. It is known in the art that intramuscular adipose tissue can be measured or estimated by differentiating it from subcutaneous adipose tissue (SAT) and muscle in thigh cross-sections or slices using computerized tomography (CT) and magnetic resonance imaging (MRI). For example, an area of SAT can be manually deselected from an image and an image thresholding algorithm can then be used to distinguish muscle from intramuscular adipose tissue. However, the relatively high cost of both examinations and the high radiation dosage of CT can discourage the use of these techniques as a screening fool for intramuscular adipose tissue levels. Further, thresholding algorithms lack specificity because areas or volumes above the threshold can have different amounts of fat content, and areas or volumes below the threshold may not be fat-free. Thus, systematic errors can be introduced by assumptions of % fat in areas or volumes above or below the threshold.

SUMMARY OF THE INVENTION

In accordance with one non-limiting aspect of the invention a method comprises acquiring x-ray measurements for respective pixel positions related to a two-dimensional projection image of a portion of a subject, wherein at least some of the measurements are dual-energy x-ray measurements; placing a plurality of regions of the image; computer processing to combine the plurality of regions to provide an estimate of intramuscular adipose tissue; and providing and displaying selected results related to said estimate of intramuscular adipose tissue.

In accordance with another non-limiting aspect of the invention a method comprises: acquiring x-ray measurements for respective pixel positions related to a two-dimensional projection image of a portion of a subject's limb, wherein at least some of the measurements are dual-energy x-ray measurements; placing a first region of the image which extends from a first side of the limb to a second side of the limb; placing a second region which extends across a muscle; computer processing the first and second regions to provide an estimate of intramuscular adipose tissue; and providing and displaying selected results related to said estimate of intramuscular adipose tissue.

In accordance with another non-limiting aspect of the invention an apparatus comprises a data acquisition unit including a scanner that acquires x-ray measurements for respective pixel positions related to a two-dimensional projection image of a portion of a subject, wherein at least some of the measurements are dual-energy x-ray measurements; a memory in which is placed a plurality of regions of the image; a processing unit that computer-processes the regions to provide an estimate of intramuscular adipose tissue; and a display unit that provides and displays selected results related to intramuscular adipose tissue of the subject.

In accordance with another non-limiting aspect of the invention an apparatus comprises: a data acquisition unit including a scanner that acquires x-ray measurements for respective pixel positions related to a two-dimensional projection image of a portion of a subject's limb, wherein at least some of the measurements are dual-energy x-ray measurements; a memory in which is placed a first region of the image which extends from a first side of the limb to a second side of the limb, and a second region which extends across a muscle; a processing unit that computer-processes the first and second regions to provide an estimate of intramuscular adipose tissue; and a display unit that provides and displays selected results related to intramuscular adipose tissue of the subject.

Aspects of the present invention provide advantages over the prior art. Dual-energy x-ray absorptiometry (DXA) exams are widely available, rapid, relatively low dose, and much less costly than CT and MRI exams. Further, DXA is capable of measuring both global, and regional fat mass because, for tissue paths that are projected as pixels in the x-ray image, a given dual-energy x-ray measurement pertains to a unique combination of fat and lean mass. Consequently, DXA measurement of intramuscular adipose tissue could be a preferred diagnostic tool for Sarcopenia and other conditions.

In various non-limiting alternatives one or more functions ears be automated or partially automated with computer processing. For example, the first region can be automatically placed by a software tool using various anatomical landmarks and the position of an upper region of interest line for reference. Further, the software tool may automatically place the second region based on % Fat inflection. Further, measurements of total adipose tissue in a fixed thickness region across the entire width of the limb can be combined with a measurement of the adipose tissue in the same thickness region of the muscle plus whatever subcutaneous fat is present above and below the muscle region using a linear equation that is correlated with intramuscular adipose tissue measured by quantitative computed tomography in order to estimate intramuscular adipose tissue.

DETAILED DESCRIPTION

Figure 1:
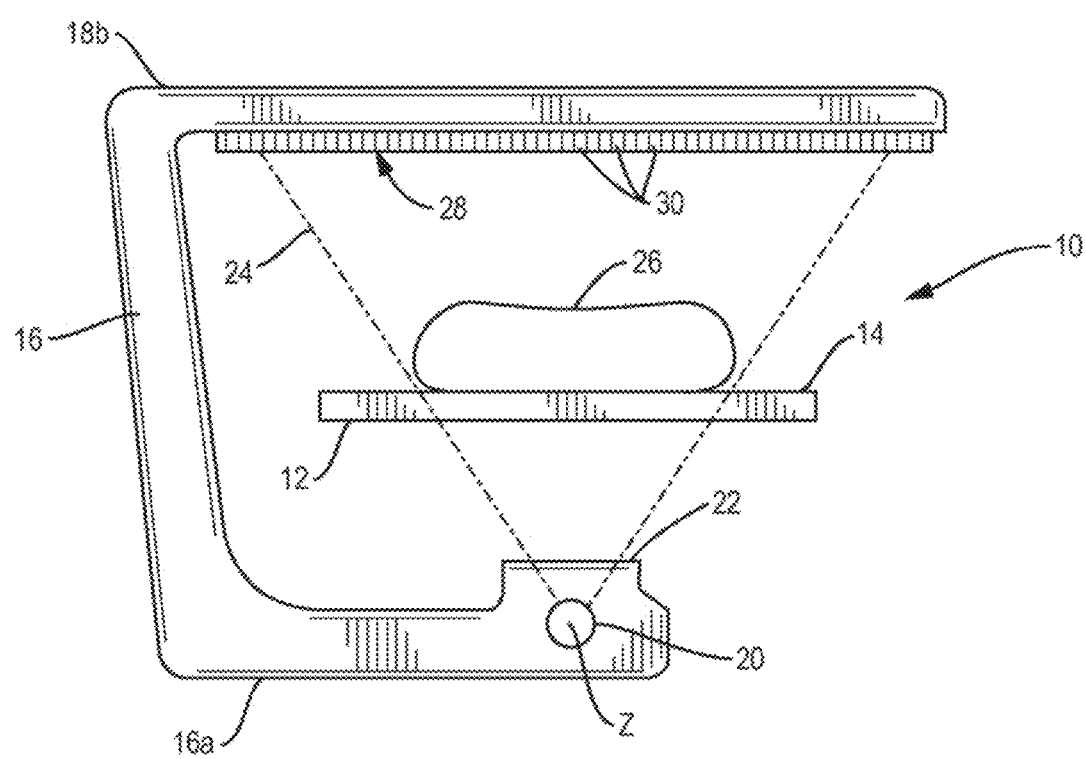
FIG. 1 is a simplified and schematic cross-sectional elevation illustrating a fan-shaped distribution of x-rays in a DXA system in which the intramuscular adipose tissue analysis described herein can be practiced.

Referring to FIG. 1, a DXA system 10 includes a patient table 12 having a support surface 14 that can be considered horizontal and planar in this simplified explanation and illustration which is not necessarily accurate in scale or geometry, and which is used here solely to illustrate and explain certain principles of operation. A human subject 26 is supine on surface 14. The length of the patient is along a horizontal longitudinal axis defined as the y-axis and the patient's arms are spaced from each other along the x-axis. A C-arm 16 has portions 16a and 16b extending below and above table 10, respectively, and is mounted in a suitable structure (not shown expressly) for moving at least parallel to the y-axis along the length of patient 26. Lower portion 16a of the C-arm carries an x-ray source 20 that can omit x-rays limited by an aperture 22 into a fan-shaped distribution 24 conforming to a plane perpendicular to the y-axis. The energy range of the x-rays can be relatively wide, to allow for the known DXA dual-energy x-ray measurements, or can be filtered or generated in a narrower range to allow for single energy x-ray measurements. The x-ray distribution can be continuous within the angle thereof or can be made up, or considered to be made up, of individual narrower beams. The x-ray distribution 24 can encompass the entire width of the patient as illustrated, or it can have a narrower angle so the entire patient can be covered only by several passes along the y-axis and the x-ray measurements from the several passes can be combined as is known in the art to simulate the use of a wider fan beam, as typical in current commercial DXA systems. Alternatively, a single, pencil-like beam of x-rays can be used to scan selected regions of me patient's body, e.g. in a raster pattern. The x-rays impinge on x-ray detector 28, which can comprise one or more linear arrays of individual x-ray elements 30, each linear array extending in the x-direction, or a continuous detector where measurements for different positions along the detector can be defined in some manner known in the art, or can be another form of detector of x-rays. C-arm 16 can move at least along the y-axis, or can be maintained at any desired position along that axis. For any one position, or any one unit of incremental travel in the y-direction of arm 16, detector 28 can produce one or several lines of raw x-ray data. Each line can correspond to a row of pixels in a resulting image, which row extends in a direction corresponding to the x-direction. Each line corresponds to a particular position, or range of positions, of the C-arm in its movement along the y-axis and/or a particular linear detector, and comprises a number of individual measurements, each for a respective detector element position in the line, i.e., represents attenuation that the x-rays have suffered in traveling from source 20 to a respective detector element position over a specified time interval. A DXA system takes a higher x-ray energy measurement H and a lower x-ray energy measurement L from each detector element position, and carries out initial processing known in the art to derive, from the raw x-ray data, a set of pixel values for a projection image. Each pixel value comprises a high energy value H and a low energy value L. This can be achieved by rapidly alternating the energy level of the x-rays from source 20 between a higher and a lower range of x-ray energies, for example by rapidly rotating or otherwise moving a suitable filter in or out of the x-rays before they reach patient 26, or by controlling the x-ray tube output, and/or by using an x-ray detector 28 that can discriminate between energy ranges to produce H and L measurements for each pixel position, e.g. by having a low energy and a high energy detector element side-by-side or on top of each other for respective positions in the detector array. The H and L x-ray measurements for the respective pixel positions are computer-processed as known in the art to derive estimates of various parameters, including, if desired, body composition (total mass, fat mass, and lean mass).

Figure 2:
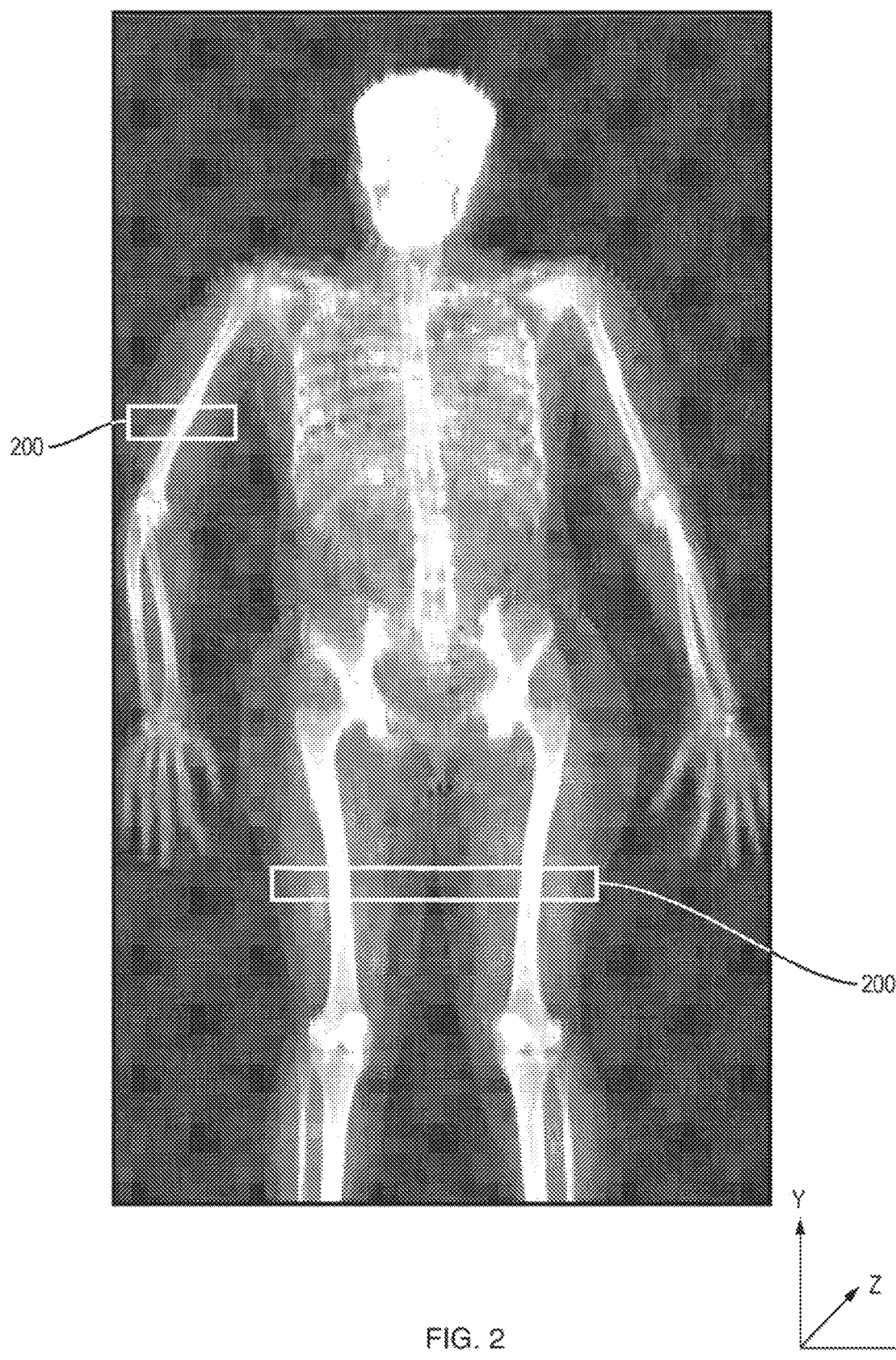
FIG. 2 illustrates a PA projection image of a patient taken with a DXA system.

FIG. 2 illustrates a PA projection image taken with the DXA system. Pixel values are derived from x-ray measurements for at least one limb slice 200. For example, measurements may be taken of one or both thighs, bleeps, or any combination thereof. The slice is taken along the z-x plane and has a thickness (w) in the y-direction. For example, several hundred pixel values in the x-direction and a several pixel values in the y-direction are derived from the raw x-ray data. Typically but not necessarily, the limb slice thickness w along the y-direction is several mm, e.g. 10-15 mm.

Figure 3:
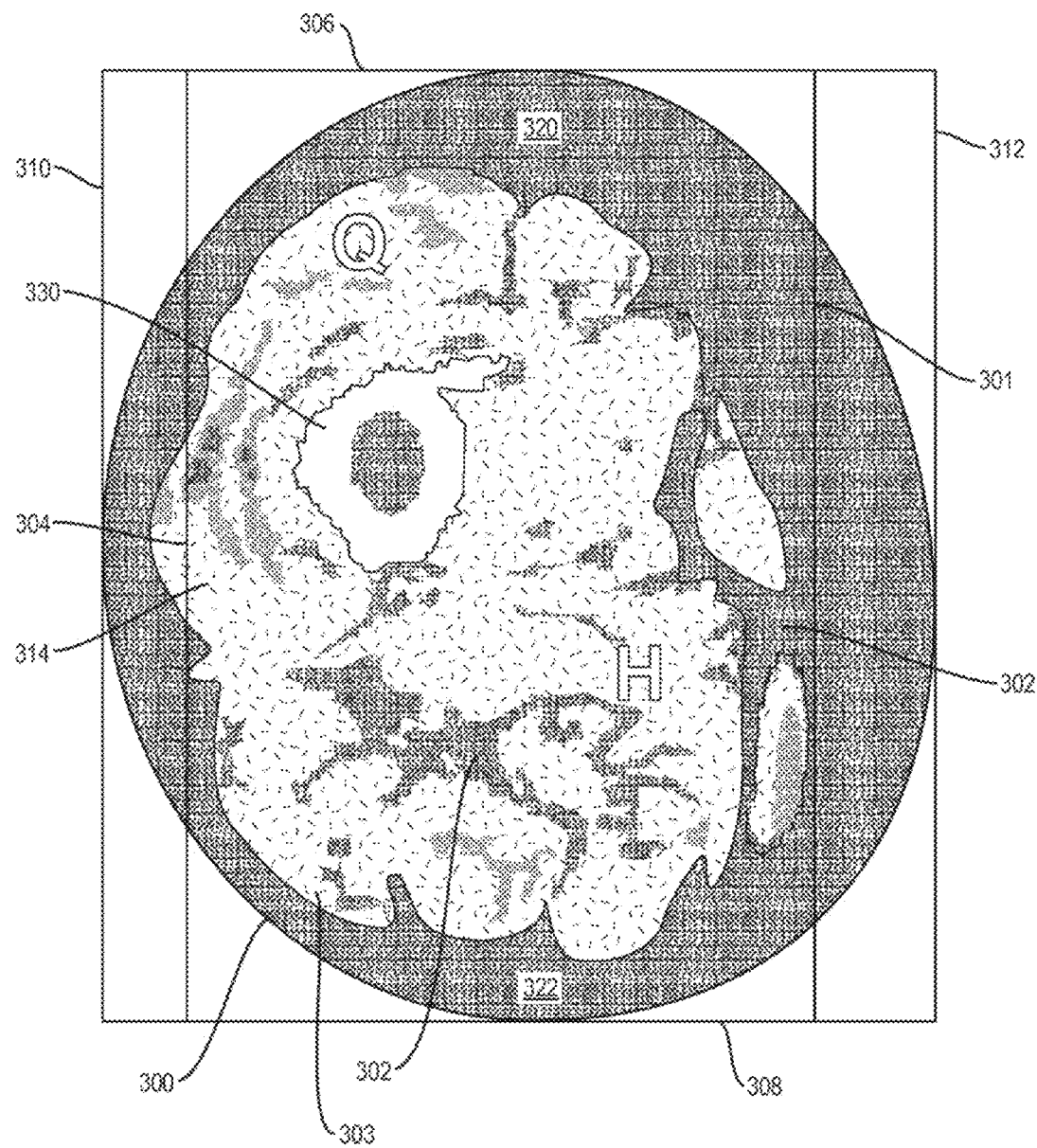
FIG. 3 illustrates a cross-sectional image of a limb slice.

FIG. 3 illustrates an x-ray image of slice 200 (FIG. 2) parallel to a z-x plane through the thigh of a patient taken with a CT system. The image shows a ring (non-circular) of subcutaneous adipose tissue (SAT) between the skin 300 and muscle wall 303. The image also shows regions of intramuscular adipose tissue 302, muscle 314, and thigh bone 330.

Figure 4:
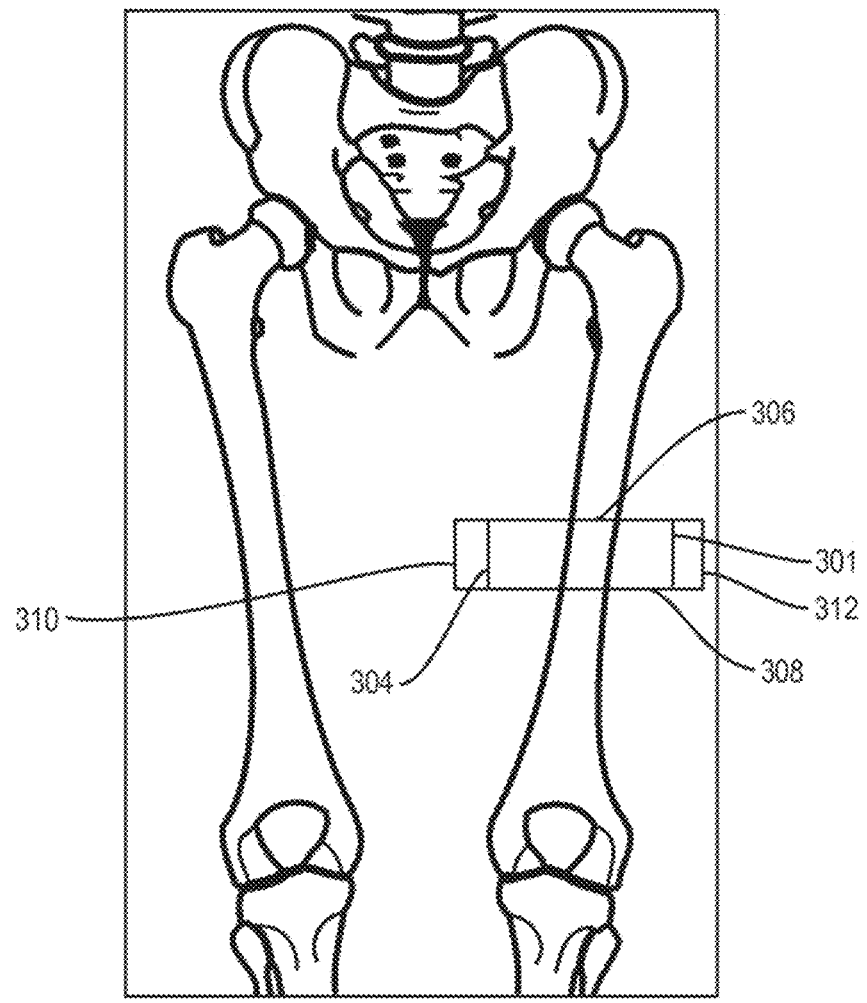
FIG. 4 illustrates placement of regions.

Referring to FIGS. 2 through 4, in accordance with one embodiment of the invention the percentage of intramuscular adipose tissue is estimated with a DXA system using an empirical technique. A region of interest (ROI) is placed on a DXA scan slice 200 to delineate various anatomical regions in accordance with the instructions in the User's Guide for the Hologic DXA scanner. After the ROI has been placed on the scan, a large region and a smaller region, both rectangular in shape and 4 scan lines (5 cm) high, are placed at the location of the subject's limb. In the illustrated example the large region is defined by boundaries 306, 308, 310, 312, and extends completely across the limb from one side to the opposite side. The smaller region is defined by boundaries 304 301, 306, 308, centered within the large region, and extends across the muscle. Both the large and small regions can be placed by the user based on visual inspection of the image. However, in accordance with an embodiment of the invention the larger region is automatically placed by a software tool that is stored in non-transitory computer readable memory and run by processing hardware. For example, the software tool may place the larger region using various anatomical landmarks and the position of the upper ROI line for reference.

Figure 5:
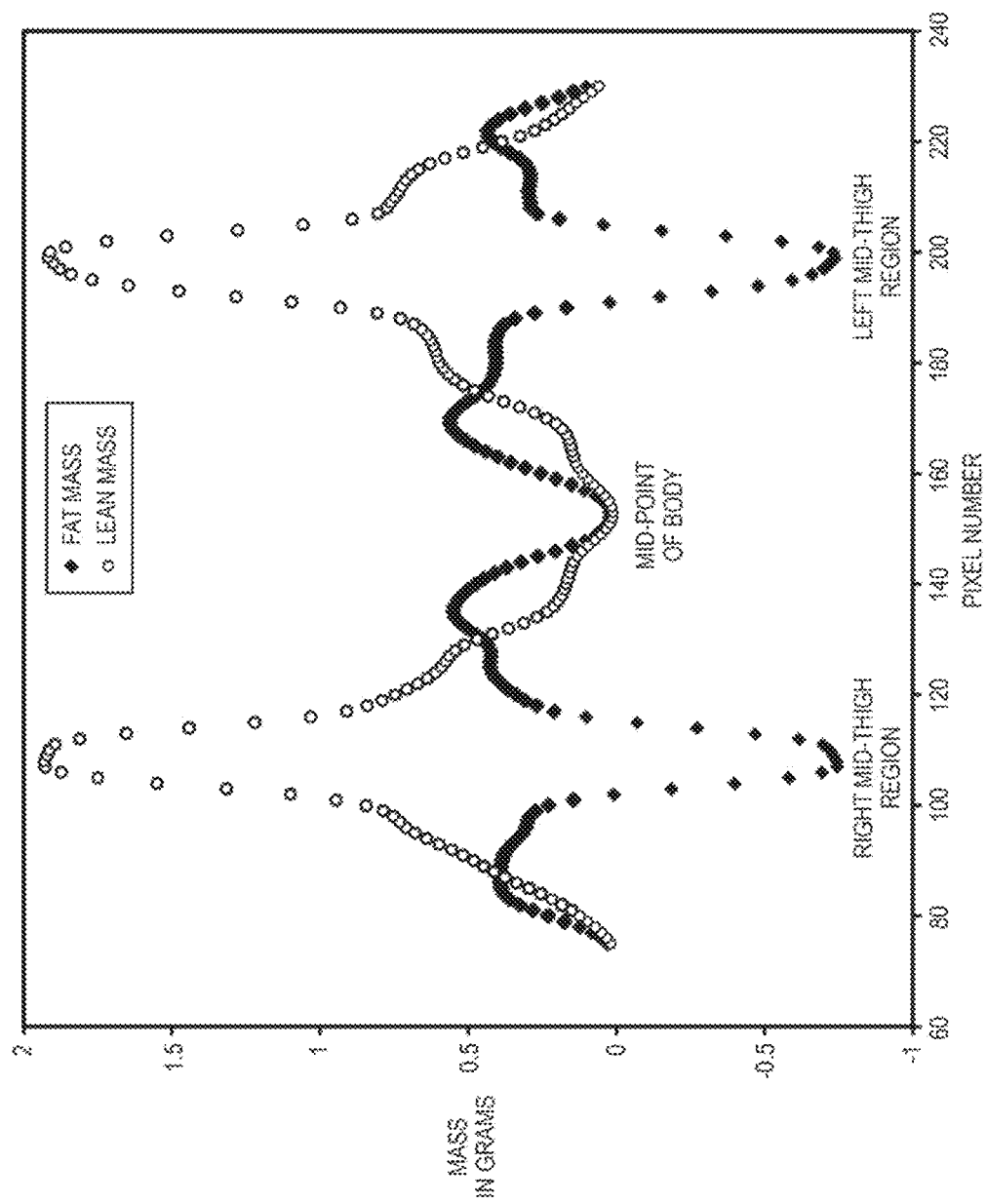
FIG. 5 illustrates a % fat profile and inflection points used for region placement.

Referring to FIGS. 3 through 5, the software tool may also automatically place the smaller region within the larger region. In one embodiment this is accomplished with an algorithm which places boundaries based on % Fat inflection. The upper and lower boundaries 306, 308 of the smaller region are superimposed over the larger region such that the upper and lower coordinates of both regions are identical. The left and right boundaries 304, 301 of the smaller region are then placed by the algorithm. In particular, the algorithm initially operates on percent fat profile data corresponding to a position inside the left and right boundaries 310, 312 of the large region, e.g., at the point where the subcutaneous fat layer ends, and proceeds by operating on data corresponding to an adjacent set of pixels moving in toward the center the limb from the left and right sides. Measurement of % Fat initially increases and then decreases as the x-ray beam begins to scan the area of muscle 314. This inflection point, which is indicative of the outermost extent of the muscle, is detected by the algorithm, e.g., by identifying that the % Fat values of two consecutive pixels are lower than the preceding pixel. The smaller region boundaries 304, 301 are set at the inflection point.

Regardless of how the boundaries which define the regions are placed, a linear regression technique that accounts for SAT between the boundaries of the larger region is used to estimate intramuscular adipose tissue. The large region defined by boundaries 306, 308, 310, 312 provides a measurement of total adipose tissue in a 5 cm wide region across the entire width of the subject's limb. The smaller region defined by boundaries 304, 301, 306, 308 provides a measurement of the adipose tissue in the same 5 cm wide region of the limb plus whatever subcutaneous fat is present above (at region 320) and below (at region 322) the muscle region in the two dimensional DXA projection. Constant percent fat values at the center of the plot in FIG. 5 indicate image pixels where bone 330 (FIG. 3) is present and percent fat cannot be directly measured. However, techniques for estimating percent fat values for the region where bone is present and percent fat cannot be directly measured are known. The measurement (limb adipose mass) of total adipose tissue in a 5 cm wide region across the entire width of the subject's limb and the measurement (muscle region adipose mass) of the adipose tissue in the same 5 cm wide region of the limb plus whatever subcutaneous fat is present above and below the muscle region in the two dimensional DXA projection is combined in a linear equation that is highly correlated with intramuscular adipose tissue measured by quantitative computed tomography in order to estimate intramuscular adipose tissue (IAT) as:

$$\text{DXA IAT} = J*\text{muscle region adipose mass} - K*(\text{limb adipose mass} - \text{muscle region adipose mass}) + b, \quad \text{Eq. 1}$$

where J and K are constants that optimize the correlation between DXA IAT and intramuscular adipose tissue measured by computed tomography, and b is the intercept term of the linear equation. It should be noted that the values of J, K and b are not necessarily that same for all subjects. For example, values of J, K and b can be dependent upon age, gender, ethnicity, weight, height, body mass index, waist circumference, and other anthropomorphic variables. Those skilled in the art will understand how to determine those constants in view of this disclosure.

The results of the processes described above can be in various forms and can be used for a variety of purposes. For example, displays of numerical values can be used in assessing the health, treatment options, or treatments of a patient by a health professional. As another example, such numerical values or estimates derived therefrom can be used as inputs to automated systems for similar assessment or for treatment planning. As yet another example, parameters related to fat metrics can be displayed and recorded or printed as a part of an otherwise typical report including x-ray images and other DXA-produced information for a patient.

Estimates of intramuscular adipose tissue derived as discussed above can be shown in a variety of ways. They can be displayed alone, or in combination with known or expected ranges of comparable estimates for populations believed to be "normal" or "healthy," which ranges can be matched to the estimates for a patient by some characteristic such as age, sex, and/or ethnicity. The normal or healthy ranges for such characteristics can be obtained by retrospective analysis of already completed studies and/or from new studies to obtain the data. An intramuscular adipose tissue metric for a patient can be compared with an intramuscular adipose tissue metric for the same patient taken at a different time to estimate the change and/or the rate of change, for example to see if visceral fat parameters have improved or have deteriorated over some period of time or in relation to some treatment or regimen. Such changes also can be matched to expected or known or estimated ranges to see if the change or rate of change for a patient is statistically significant as distinguished from a change within the precision range of the estimate. The intramuscular adipose tissue estimates derived as discussed above, or metrics based on such estimates, can be used in other ways as well. One non-limiting example is to produce reports similar to those produced for BMD (bone mineral density) in current commercial bone densitometry (DXA) systems but for metrics of intramuscular adipose tissue rather than BMD estimates.

Figure 6:
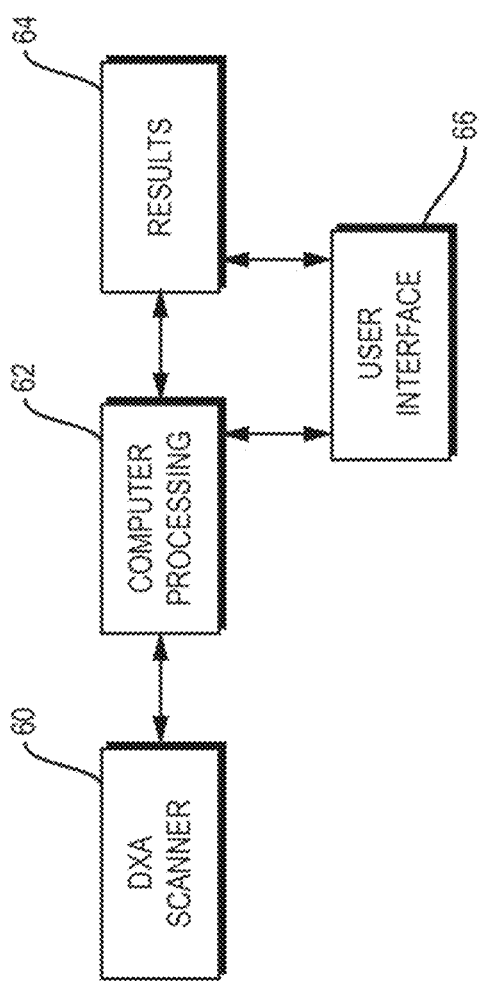
FIG. 6 is a block diagram of a DXA system useful for estimating intramuscular adipose tissue.

FIG. 6 illustrates in block diagram form a DXA system carrying out the processes described above for estimating intramuscular adipose tissue. The system can be one of the current DXA systems offered commercially by the assignee programmed to carry out the disclosed processes, using programming that a person of ordinary skill in the art can apply to a particular commercially available DXA system without undue experimentation, given the teachings in this patent specification. The system includes a scanner 60, computer processing unit 62, user interlace 66, and a results presentation unit 64. The scanner may include an x-ray source and x-ray detector. Scanner 60 also includes appropriate other components known in the art, such as power and control units, and operates to generate dual energy or single energy x-ray measurements of the selected region or slice of a patient's body. The computer processing unit 62 includes processing hardware and non-transitory computer readable memory for controlling scanner 60 and processing x-ray measurements obtained thereby in accordance with the techniques described above under corresponding programming. A results presentation unit 64 displays, prints, stores, and/or sends for further processing or storage, results such as in the form of images and/or curves and/or numeric results indicative of intramuscular adipose tissue or % IAT, or some other parameter related to intramuscular fat or other parameter discussed above, including in the immediately preceding paragraph. Units 62 and 64 communicate interactively with a user input unit 66. The actual physical arrangement of system components may differ from the functional illustration in FIG. 6.

Figure 7:
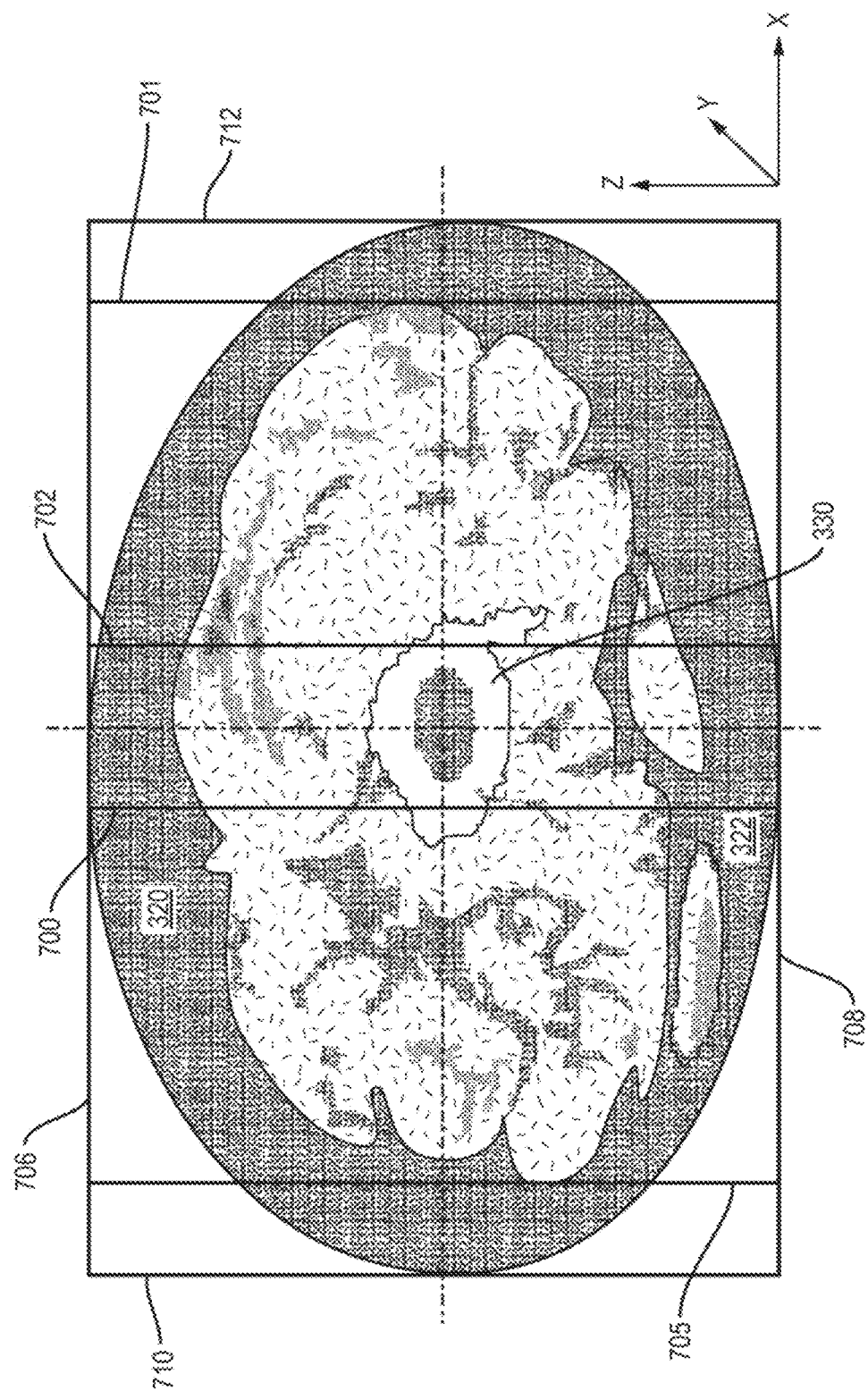
FIG. 7 is a cross-sectional image of a limb slice which illustrates use of more than two regions.

FIG. 7 is a cross-sectional image of a body slice which illustrates an alternative embodiment utilizing more than two regions. A large region defined by boundaries 706, 708, 710, 712 provides a measurement of total adipose tissue in a 5 cm wide region across the entire width of the limb. A smaller region which includes a first portion defined by boundaries 700, 705, 706, 708 and a second portion defined by boundaries 702, 701, 706, 708 provides a measurement of the adipose tissue in the same 5 cm wide region of the muscle area, exclusive of the bone 330 region, and plus whatever subcutaneous fat is present above (at region 320) and below (at region 322) the muscle region in the two dimensional DXA projection. The "bone" region defined by boundaries 700, 706, 702, 708 provides a measurement of adipose tissue where bone is present and percent fat cannot be directly measured. A generalized linear equation for combining the measurements of adipose tissue in order to estimate intramuscular adipose tissue (IAT) with three regions can be represented as:

$$\text{DXA IAT} = J*\text{Region1} + K*\text{Region2} + L*\text{Region3} + b, \quad \text{Eq. 2}$$

where J, K and L are constants (which may differ from those of Eq. 1) that optimize the correlation between DXA IAT and intramuscular adipose tissue measured by computed tomography, and b is the intercept term of the linear equation. As in the previously described embodiment, the values of the constants (here J, K, and L) and intercept b are not necessarily that same for all subjects. For example, values of J, K, L and b can be dependent upon age, gender, ethnicity, weight, height, body mass index, waist circumference, and other anthropomorphic variables. Those skilled in the art will understand how to determine those constants in view of this disclosure. Furthermore, the two region and three region embodiments are merely exemplary, and any number of regions could be defined and utilized to estimate IAT.

In an alternative embodiment polynomial expansion is used to estimate intramuscular adipose tissue. A generalized equation for combining the measurements of adipose tissue using polynomial expansion in order to estimate intramuscular adipose tissue (IAT) can be represented as:

$$\text{DXA IAT} = J1(\text{Region1}) + J2(\text{Region1})^2 + J3(\text{Region1})^3 + \ldots, \quad \text{Eq. 3}$$

where $J_n$ and constants associated with the polynomial expansion of the other regions (eg. $K_n$ and $L_n$) optimize the correlation between DXA IAT and intramuscular adipose tissue measured by computed tomography. As in the previously described embodiment, the values of the constants are not necessarily the same for all subjects, and can be dependent upon age, gender, ethnicity, weight, height, body mass index, waist circumference, and other anthropomorphic variables.

The disclosure above is mainly in terms of SAT and intramuscular adipose tissue of human patients, but it should be clear that the approach is applicable in other fields as well, such as in analysis of other subjects, such as live animals and carcasses. Finally, while a currently preferred embodiment has been described in detail above, it should be clear that a variation that may be currently known or later developed or later made possible by advances in technology also is within the scope of the appended claims and is contemplated by and within the spirit of the detailed disclosure.

What is claimed is:

1. A dual energy x-ray absorptiometry (DEXA) method for determining intramuscular fat of a selected sub-volume of an intramuscular fat volume of a patient, which intramuscular fat volume is surrounded by a subcutaneous fat volume and together therewith forms a total volume of a patient's limb, comprising:
    acquiring x-ray measurements of the patient's limb for respective pixel positions related to a two-dimensional projection image of said total volume, wherein at least some of the measurements are dual-energy x-ray measurements of the subcutaneous fat and the intramuscular fat to thereby make subcutaneous fat and intramuscular fat regions of the patient visible in a dual-energy image of the patient's limb;
    placing a plurality of regions relative to the image;
    computer processing said dual-energy x-ray measurements to determine a metric of intramuscular fat contained in said sub-volume of the intramuscular fat volume that also contains material that is not intramuscular fat; and
    providing and displaying selected results related to said intramuscular fat metric.

2. The method of claim 1, wherein the step of computer processing further comprises combining the plurality of regions to determine the metric of intramuscular fat by correlating dual-energy x-ray measurements and computed tomography measurements.

3. The method of claim 2, wherein the step of combining includes combining the plurality of regions using a linear correlation.

4. The method of claim 3, wherein the using a linear equation comprises using constants that provide correlation between the dual-energy x-ray measured intramuscular fat and intramuscular fat measured by computed tomography.

5. The method of claim 2, wherein the step of combining includes combining the plurality of regions using polynomial expansion.

6. A dual energy x-ray absorptiometry (DEXA) method for determining intramuscular fat of a selected sub-volume of an intramuscular fat volume of a patient, which intramuscular fat volume is surrounded by a subcutaneous fat volume and together therewith forms a total volume of a patient's limb, comprising:
    acquiring x-ray measurements of the patient's limb for respective pixel positions related to a two-dimensional projection image of said total volume, wherein at least some of the measurements are dual-energy x-ray measurements of the subcutaneous fat and the intramuscular fat to thereby make subcutaneous fat and intramuscular fat regions of the patient visible in a dual-energy image of the patient's limb;
    placing a plurality of regions relative to the image, wherein the placing a plurality of regions comprises placing a first region of the image which extends from a first side of the patient's limb to a second side of the patient's limb, and placing a second region which extends across a muscle area from a first side to a second side between outermost extends of muscle wall;
    computer processing said dual-energy x-ray measurements to determine a metric of intramuscular fat contained in said sub-volume of the intramuscular fat volume that also contains material that is not intramuscular fat; and
    providing and displaying selected results related to said intramuscular fat metric.

7. The method of claim 6, wherein the second region is exclusive of a third region which is placed where bone is present and percent fat cannot be directly measured.

8. The method of claim 1, wherein the placing a plurality of regions comprises computer processing at least some of the x-ray measurements for placing at least one region of the image.

9. The method of claim 8, wherein the placing a plurality of regions comprises computer processing at least some of the x-ray measurements for placing a second region of the image.

10. A dual energy x-ray absorptiometry (DEXA) method for determining intramuscular fat of a selected sub-volume of an intramuscular fat volume of a patient, which intramuscular fat volume is surrounded by a subcutaneous fat volume and together therewith forms a total volume of a patient's limb, comprising:
    acquiring x-ray measurements of the patient's limb for respective pixel positions related to a two-dimensional projection image of said total volume, wherein at least some of the measurements are dual-energy x-ray measurements of the subcutaneous fat and the intramuscular fat to thereby make subcutaneous fat and intramuscular fat regions of the patient visible in a dual-energy image of the patient's limb;

placing a plurality of regions relative to the image, wherein the placing a plurality of regions comprises computer processing at least some of the x-ray measurements for placing at least a first region of the image and a second region of the image;

identifying a left and a right muscle wall by identifying inflection of intramuscular fat values for placing the second region of the image;

computer processing said dual-energy x-ray measurements to determine a metric of intramuscular fat contained in said sub-volume of the intramuscular fat volume that also contains material that is not intramuscular fat; and providing and displaying selected results related to said intramuscular fat metric.

11. The method of claim 6 further comprising using an anatomical landmark and a preselected region of interest line for placing the first region of the image.

12. The method of claim 6 further comprising combining the first region and the second region in a linear equation that is correlated with intramuscular fat measured by quantitative computed tomography for processing the first and second regions to provide an estimate of intramuscular fat.

13. The method of claim 1, wherein the placing a plurality of regions comprises placing a first region of the image, the method further comprising using an anatomical landmark and a preselected region of interest line for placing the first region of the image.

14. The method of claim 6, wherein the step of computer processing further comprises combining the first and second regions to determine the metric of intramuscular fat by correlating dual-energy x-ray measurements and computed tomography measurements.

15. The method of claim 10, wherein the step of computer processing further comprises combining the plurality of regions to determine the metric of intramuscular fat by correlating dual-energy x-ray measurements and computed tomography measurements.

16. The method of claim 15, wherein the step of combining includes combining the plurality of regions using a linear correlation.

17. The method of claim 16, wherein the using a linear equation comprises using constants that provide correlation between the dual-energy x-ray measured intramuscular fat and intramuscular fat measured by computed tomography.

18. The method of claim 15, wherein the step of combining includes combining the plurality of regions using polynomial expansion.

19. The method of claim 10, wherein the second region is exclusive of a third region which is placed where bone is present and percent fat cannot be directly measured.

* * * * *